United States Patent
El et al.

[11] Patent Number: 5,911,938
[45] Date of Patent: Jun. 15, 1999

[54] ROTATIONAL MOLDING WITH REMOVABLE FIXTURE

[75] Inventors: Hilogi Jesse El, Arvada, Colo.; Arlen Huff, Sydney, Ohio; Grant Oakes, Aurora, Colo.

[73] Assignee: Windsor Industries, Inc., Englewood, Colo.

[21] Appl. No.: 08/799,601

[22] Filed: Feb. 12, 1997

[51] Int. Cl.⁶ ................................................. B29C 41/06
[52] U.S. Cl. ........................ 264/261; 264/267; 264/278; 264/310
[58] Field of Search ..................... 264/278, 310, 264/267, 271.1, 259, DIG. 60, 275, 261, 249; 425/425, 434, 435

[56] References Cited

U.S. PATENT DOCUMENTS

| | | | |
|---|---|---|---|
| 3,204,959 | 9/1965 | Nicholls | 264/310 |
| 3,293,018 | 12/1966 | Doty | 264/310 |
| 3,364,292 | 1/1968 | Lemelson | 264/310 |
| 3,365,351 | 1/1968 | Maaz et al. | 264/310 |
| 3,397,887 | 8/1968 | Caplan | 264/310 |
| 3,610,457 | 10/1971 | Opalewski | 220/22 |
| 3,734,665 | 5/1973 | Guillaud | 264/310 |
| 4,143,193 | 3/1979 | Rees | 428/35 |
| 4,167,382 | 9/1979 | Freedman et al. | 264/310 |
| 4,350,656 | 9/1982 | Moertel | 264/310 |
| 4,517,231 | 5/1985 | May et al. | 428/35 |
| 4,634,360 | 1/1987 | Gray | 425/130 |
| 4,692,293 | 9/1987 | Gray | 264/310 |
| 4,738,815 | 4/1988 | Friesen | 264/310 |
| 5,046,941 | 9/1991 | Batchelder et al. | 425/435 |
| 5,316,715 | 5/1994 | Gray | 264/245 |

*Primary Examiner*—Angela Ortiz
*Attorney, Agent, or Firm*—Sheridan Ross P.C.

[57] ABSTRACT

A molded unit is made using a rotational molding process. In making the molded unit, a tool assembly houses the mold material. A fixture assembly is also contained within the tool assembly. The fixture assembly holds an insert member in place. The insert member becomes an integral part of the molded unit during the rotomolding process. Preferably, the insert member is spaced from the inner walls of the tool assembly in order to permit mold material to flow and solidify in this space. The fixture assembly is removable from the interior of the molded unit through one or more access openings that are formed in the molded unit.

13 Claims, 12 Drawing Sheets

ROTATIONAL MOLDING WITH REMOVABLE FIXTURE

FIELD OF THE INVENTION

The present invention relates to molded containers and, in particular, to making a molded unit by means of a rotomolding process and using a fixture assembly that is removable from the molded unit.

BACKGROUND OF THE INVENTION

Containers for housing liquids or materials are useful in a variety of applications. Numerous cleaning machines store cleaning fluids in tanks, as well as containing liquid recovered from a floor surface during the cleaning process. Tanks for storing gasoline are common parts of vehicles.

With regard to the making of containers used with cleaning machines, it is well-known to mold such containers by well-established molding processes. Conventional mold materials are typically utilized in making such containers. Often times it is worthwhile to mold an insert into the container. That is, before the unit or article is molded, an insert is desirably positioned with the molding tool. During the molding process, the insert becomes part of the molded unit. Such inserts can have a number of different uses including as container or tank dividers or baffles. When used as part of a divider, the insert contributes to a separation between sections of an interior or chamber of the container. In one embodiment, an insert is useful as part of a divider assembly in a cleaning machine tank in which cleaning fluid is maintained separately from recovered liquid so that there is no unwanted mixing. In another embodiment, one or more baffles are included or molded into the tank during the molding process. The baffles act to dampen fluid flow and thereby reduce the impact of moving liquid in the tank.

An exemplary process for molding containers is a rotational molding process that sometimes is identified as "rotomolding". Briefly, this process involves rotating a tool assembly at desired temperatures about at least two different axes, with mold powder or material located within the tool assembly. At the conclusion of the rotomolding process, the tool assembly is separated or otherwise removed from the resulting molded unit. The use of the rotomolding process to make tanks having inserts is well-established in the prior art.

Notwithstanding such prior art disclosures and procedures, it would be advantageous to provide a rotomolding process that incorporates an insert in a straightforward manner, while achieving a high-quality molded unit with an insert member accurately disposed and solidly attached as part of the molded unit. It would be further advantageous to provide a fixture assembly that facilitates the holding of the insert during the molding process and is also easily separated from the molded unit after the rotomolding process is finished.

SUMMARY OF THE INVENTION

In accordance with the present invention, a method and system are disclosed that provide a molded unit by means of a rotomolding process that utilizes a tool assembly and a fixture assembly.

More particularly, the tool assembly includes first and second tool sections that are joined together but which can be separated for removing the molded unit from within the joined tool sections upon completion of the process for making the molded unit. The fixture assembly is disposed within the tool assembly and is used to hold an insert member in place within the interior volume of the tool assembly. The insert member can take many shapes and sizes, depending on the functions and objectives sought to be achieved by using such an insert member. In one embodiment, the insert member includes a base member and a rim. The base member extends around all of the four walls of the tool assembly and has a generally rectangular shape. A passageway or opening is provided in the base member. In one embodiment, the area of the passageway is greater than the area of the remaining portions of the insert member. In another embodiment, the insert member essentially has no passageway formed within the base member.

With regard to holding the insert member in place within the interior volume of the tool assembly, the fixture assembly includes a shroud assembly within which at least substantial portions of the insert member are held. Preferably, the insert member has free end portions that extend outwardly from the shroud assembly. Such free end portions are spaced from the walls of the tool assembly to define a peripheral gap that is occupied by portions of the molded unit, upon completion of the rotomolding process. The shroud assembly includes first and second plates between which the substantial portions of the insert member are held.

The fixture assembly also includes a connector assembly to which the shroud assembly is attached by a fixture connector, particularly using one of the two plates. The connector assembly includes, in one embodiment, first and second legs with the first leg being joined to the first plate of the shroud assembly and the second leg being connected to the tool assembly. In this embodiment, the two legs are integral and intersect to form an angle of about 90°. The second leg extends approximately half way into the interior volume of the tool assembly so that the first leg of the connector assembly is joined at about mid portions of the shroud assembly. The connector assembly is joined to the tool assembly by a tool connector.

In these embodiments, the insert member essentially extends throughout the entire height of the tool assembly. Such an insert member is useful in establishing a barrier or wall within the resulting molded unit. In the embodiment in which an opening is provided in the base member, a flexible membrane can be attached to cover the opening. Such a barrier acts as a fluid-tight seal in creating two chambers within the molded unit. Such chambers are useful in a cleaning machine that includes a cleaning liquid and a recovered liquid. The cleaning liquid is used to clean a floor surface and the recovered liquid is the liquid obtained or recovered from the floor surface as part of the cleaning process. The use of a flexible membrane in such cleaning machinery equipment is well-known in the prior art. Various implementations have been devised, such as U.S. Pat. No. 4,210,978 issued to Johnson et al. on Jul. 8, 1980.

In other embodiments, such a barrier may not be created. For example, the insert member might extend only part of the way along the height of the tool assembly so that the resulting molded unit has an insert member that acts as a baffle when it is housing liquid.

With respect to making the molded unit using the rotational molding process and in which the insert member essentially extends throughout the height of the tool assembly, such an insert member is positioned between the two plates of the shroud assembly. The connector assembly is positioned to be joined to the shroud assembly. The fixture connector fastens the shroud assembly and the first leg of the connector assembly together so that the shroud assembly and the connector assembly are attached with the insert member held between plates of the shroud assembly. The connector assembly second leg is then held to the tool assembly by the tool connector. Upon completion of these steps, the fixture assembly is held to the tool assembly at one of the two sections thereof. Mold material or powder is placed in each of the two chambers defined on opposite sides of the shroud assembly. The other of the two tool sections is next joined to the tool section to which the connector assembly is attached.

The rotomolding process is conducted by which the tool assembly is rotated simultaneously at least about two axes. The tool assembly is also subjected to conventional heating and cooling stages as part of the rotomolding process for predetermined times during which the mold material changes state from a powdered form to the molded unit. As part of the molded unit, molded unit material portions occupy the peripheral gap between the inner wall of the tool assembly and the free end portions of the insert member. The mold material in the gap includes melted, or partially melted, and subsequently re-solidified free end portions of the insert member. Because the shroud assembly acts to prevent the application of heat to other parts of the insert member, only the free end portions are partially or fully melted.

At the completion of the steps of the rotomolding process, the two tool sections of the tool assembly are separated from each other. The tool connector is unfastened or detached from the fixture assembly. The molded unit containing the fixture assembly is then suitably positioned for removal of the fixture assembly. In that regard, the molded unit includes at least one access opening that was formed when the molded unit was being molded. In one embodiment, the operator or worker is able to insert his/her arm and hand into the interior of the molded unit and unfasten or detach the fixture connector from the shroud assembly to thereby disconnect the shroud assembly from the insert member and the connector assembly. In another embodiment, a disassembly tool is utilized, which is positionable through one or more access openings. By manipulation of each of the two plates of the shroud assembly, they can be removed, together with the fixture connector, from the interior of the molded unit through such an access opening. Likewise, the connector assembly can be manipulated to be removed through the access opening, in the embodiment in which there is a passageway in the insert member. Alteratively, the second plate of the shroud assembly and the connector assembly are removed through a second access opening. In an embodiment in which the second plate and the connector assembly are not able to be manipulated past the insert member, the connector assembly must be removed from the molded unit through the second access opening formed on an opposite side of the insert member from the first access opening.

Based on the foregoing summary, a number of salient features of the present invention are readily discerned. A method is provided for producing a molded unit that includes one or more insert members that become an integral part of the molded unit. The fixture assembly for holding the insert member in place is easily positioned and removable after the molded unit is produced. One or more access openings are formed in the molded unit to permit such removal. Different size and shape fixture assemblies can be utilized for desired use and placement with one or more insert members. Similarly, different configurations of insert members can be utilized. A reduced number of parts or components are required in connection with providing the insert member as an integral component of the molded unit. Preferably, free end portions of the insert member are spaced from the inner wall of the tool assembly to permit molded material to be provided in the gap that is formed and integrally joined with the free end portions of the insert member. The shroud assembly of the fixture assembly is useful in preventing the melting of portions of the insert member other than the free end portions.

Additional advantages of the present invention will become readily apparent from the following discussion, particularly when taken together with the accompanying drawings.

DETAILED DESCRIPTION

Figure 1:
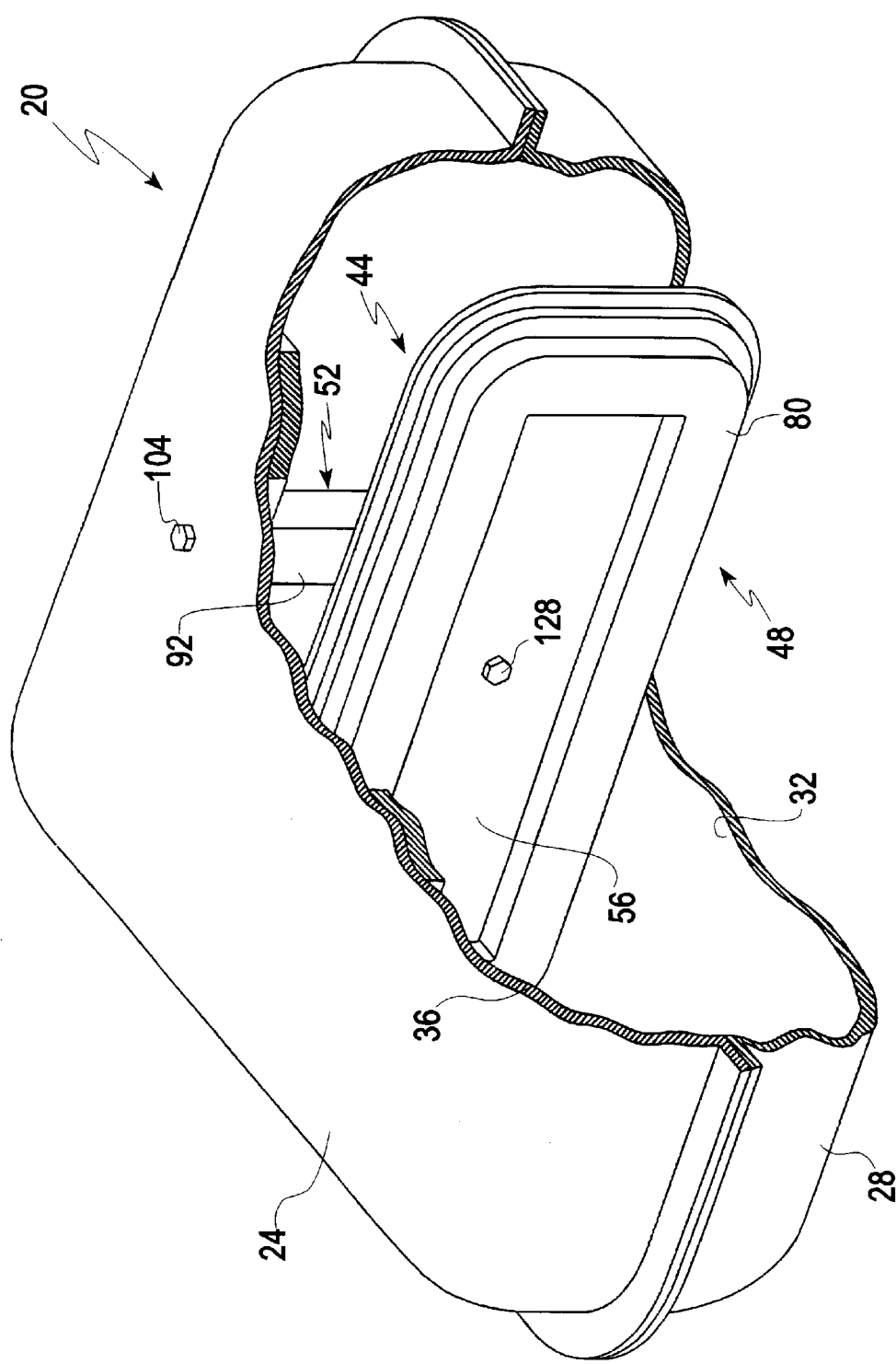
FIG. 1 is a perspective view of the tool assembly with a cut-away illustrating portions of the fixture assembly held within the interior volume of the tool assembly prior to the molding process.

A system and method are described for molding containers, tanks and the like using a rotomolding process. With reference to FIG. 1, the system includes a tool assembly 20 that is comprised of a first tool section 24 and a second tool section 28. The two tool sections 24, 28 are removably joined together using conventional means. When joined together, a tool interior volume 32 is defined within the inner walls 36 of the tool assembly 20.

Figure 2:
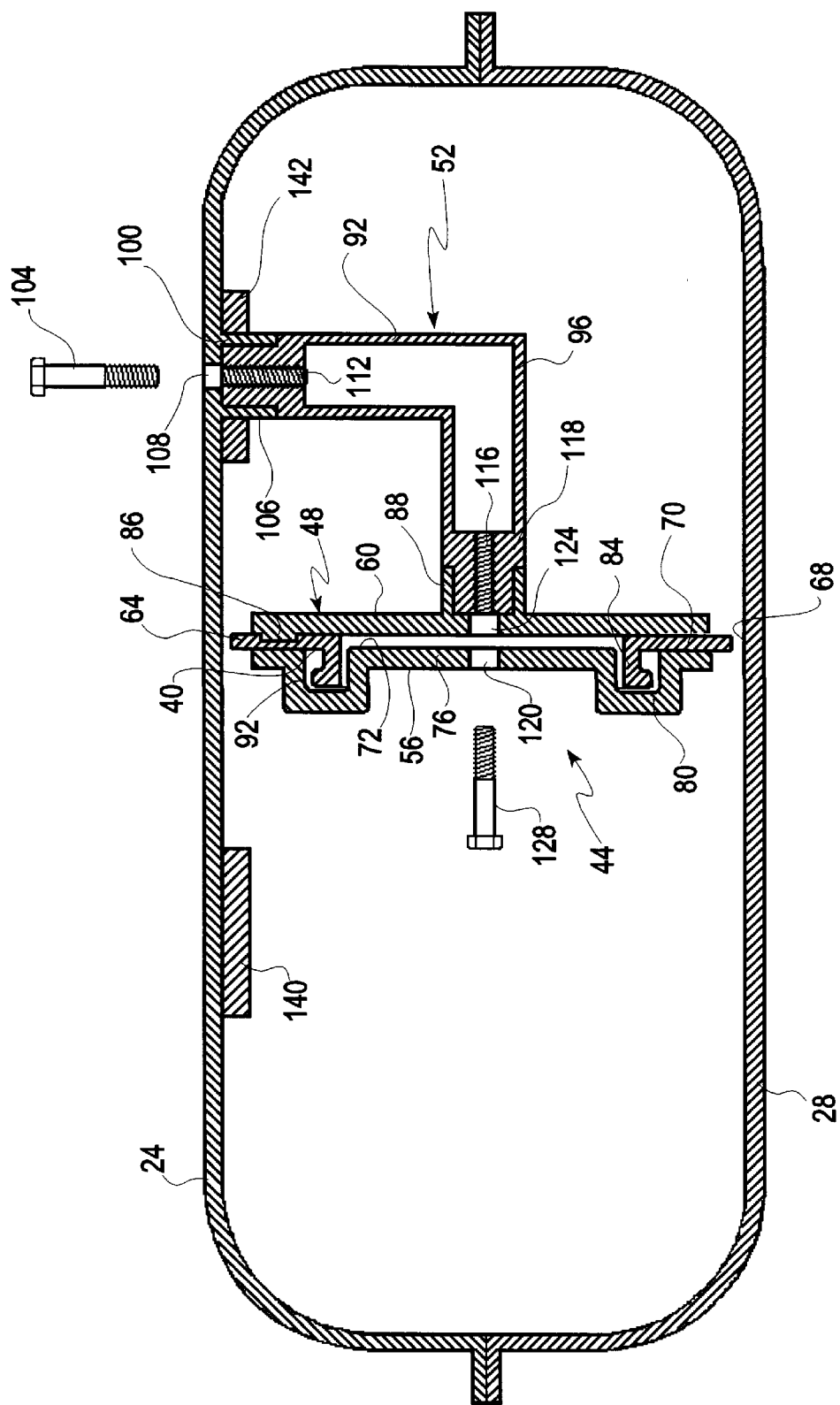
FIG. 2 is a longitudinal section of the tool assembly illustrating the fixture assembly contained therein and an insert member of a first embodiment having a passageway.
Figure 6:
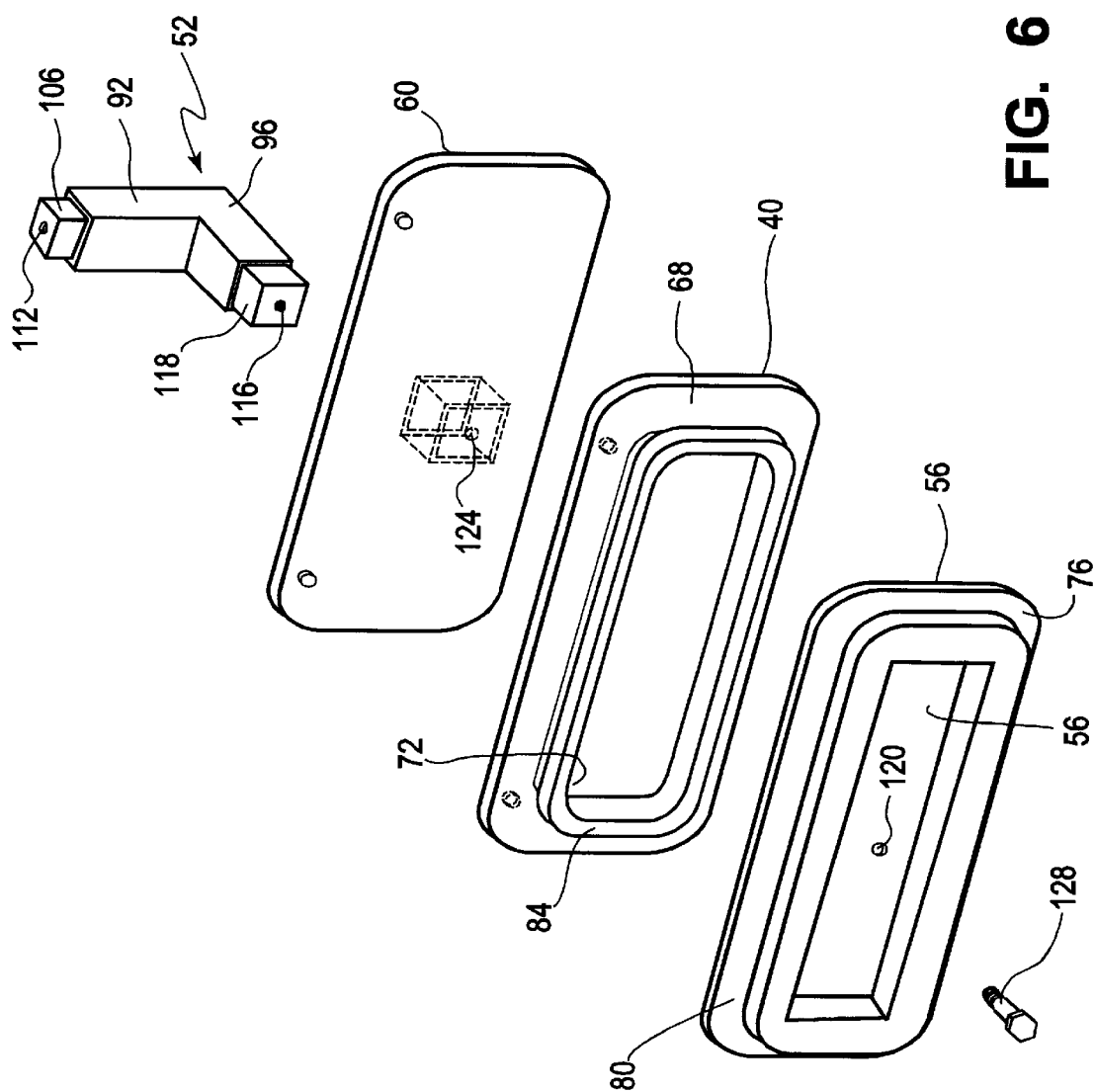
FIG. 6 is an exploded view illustrating the shroud, connector assembly and insert member of the first embodiment.
Figure 7:
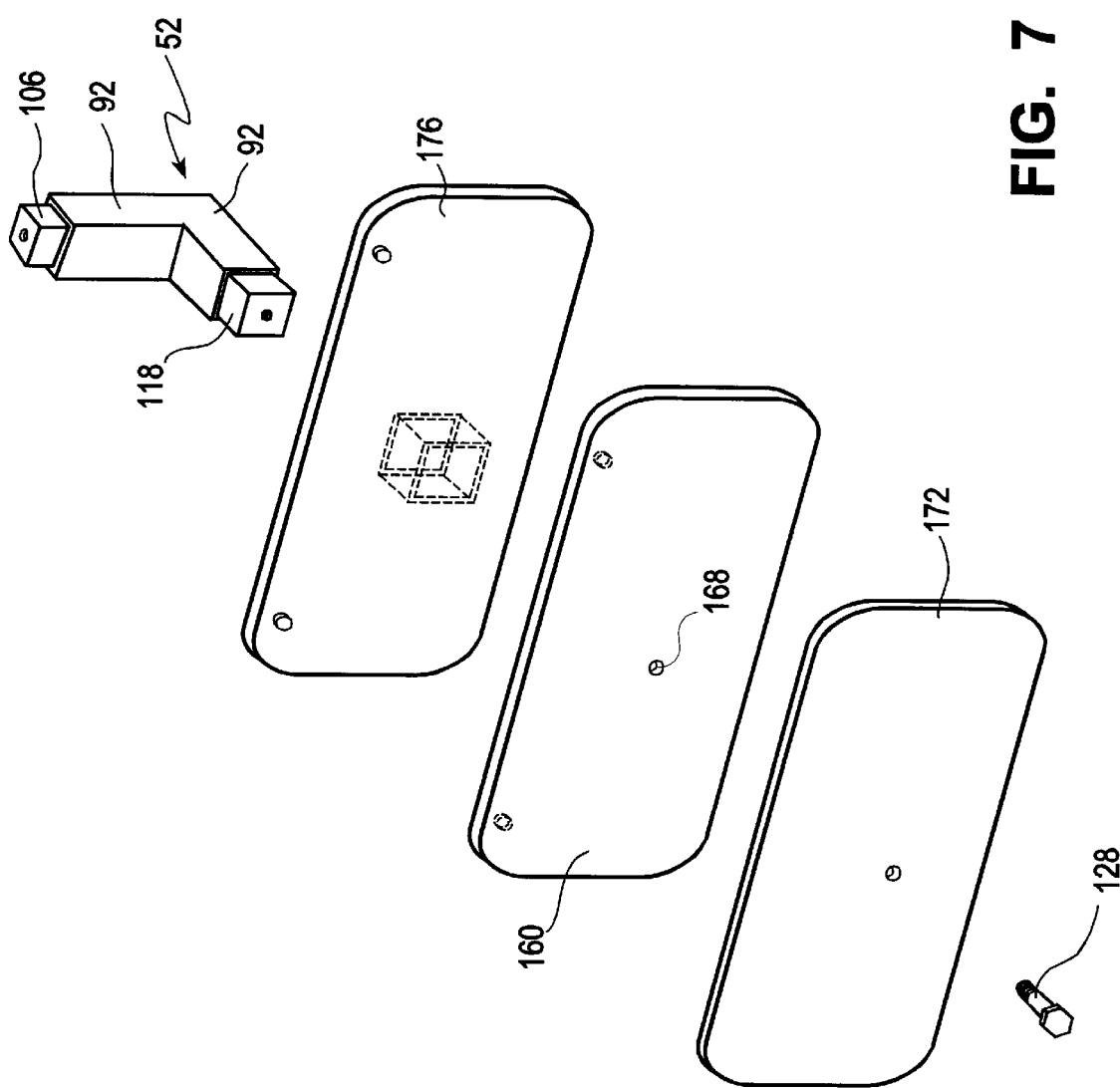
FIG. 7 is an exploded view similar to FIG. 6, but showing the insert member of the second embodiment.

With reference to FIGS. 2 and 6 as well as FIG. 1, an insert member 40 is suitably positioned within the interior volume 32 of the tool assembly 20. The insert member 40 is held within the interior volume 32 at a desired position using a fixture assembly 44 also contained within the interior volume 32. The fixture assembly 44 locates the insert member 40 in a predetermined position within the interior volume 32 by means of a shroud assembly 48 and a connector assembly 52. The shroud assembly 48 includes first and second plates 56, 60 within which substantial portions of the insert member 40 are held. Preferably, the insert member 40 has free end portions 64 that extend outwardly from the plates 56, 60 of the shroud assembly 48. Preferably also, the free end portions 64 are spaced from the inner walls 36 of the tool assembly 20 to define a gap 68. The size of the gap 68 between the free end portions 64 and the inner walls 36 is no greater than about ¾ of the resulting thickness of the unit being molded by the tool assembly 20 and no less than about ⅛ of the thickness of the unit being molded.

Figure 8:
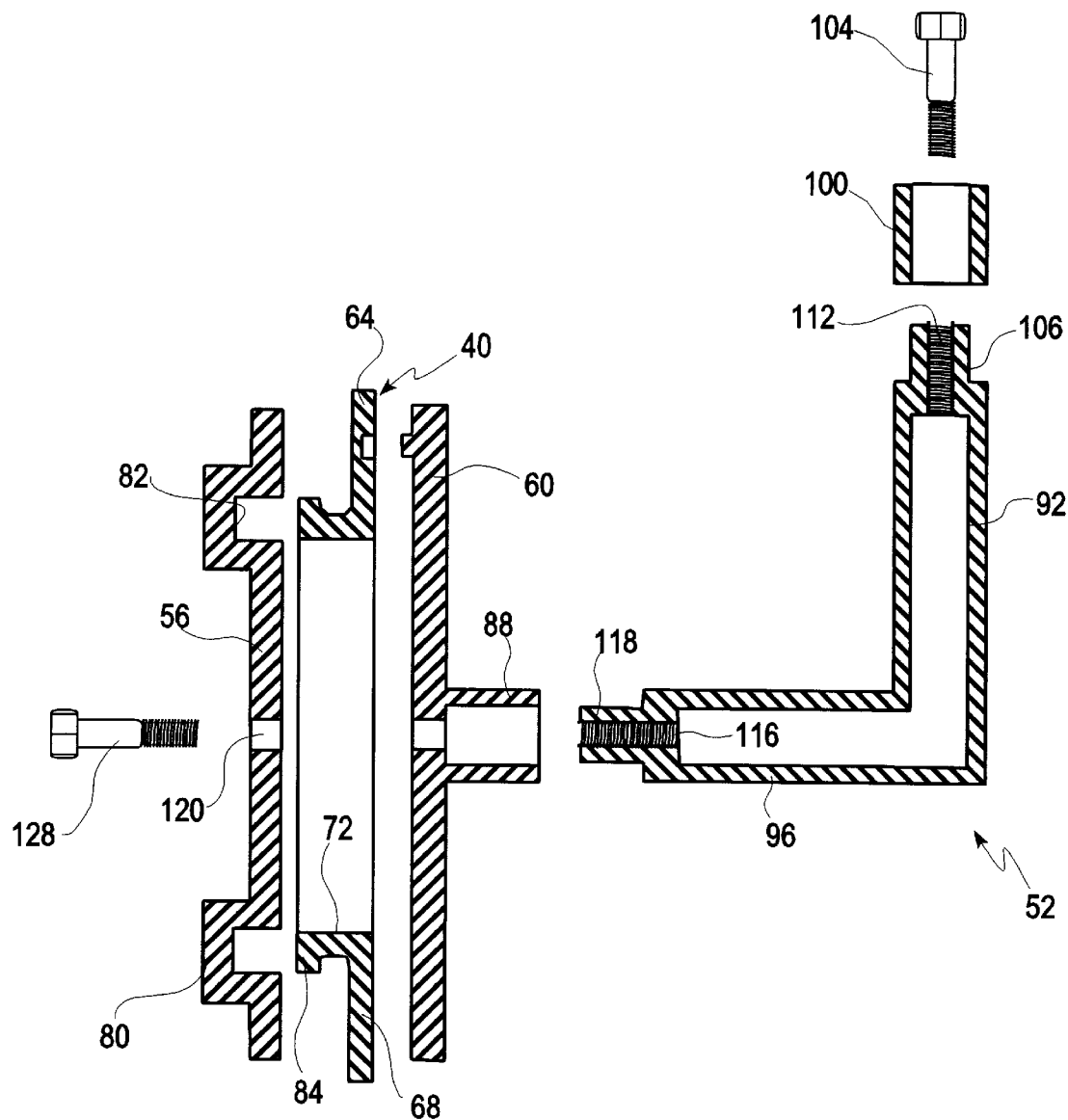
FIG. 8 is an exploded cross-sectional view of the fixture assembly and insert member of the first embodiment.
Figure 9:
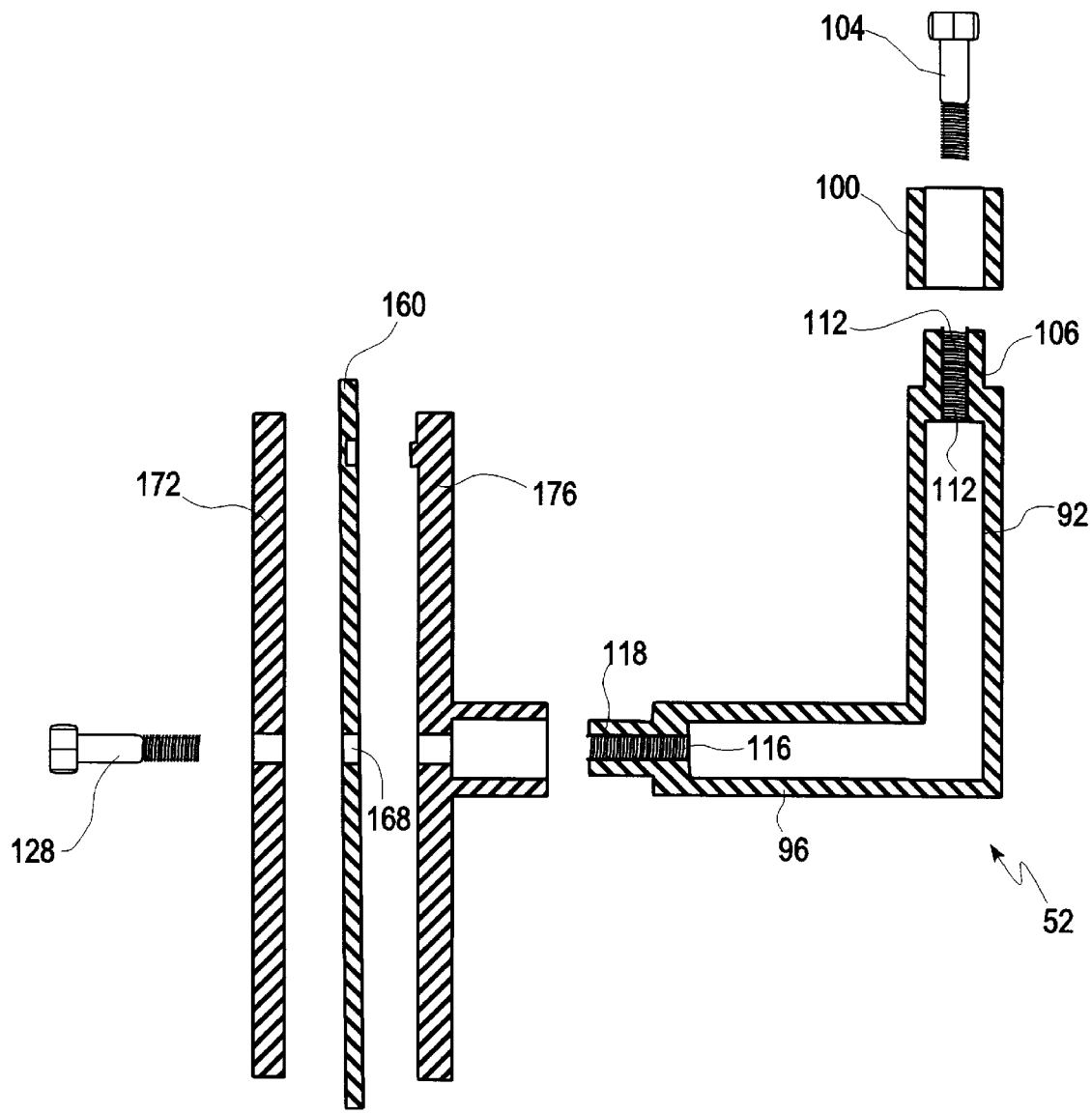
FIG. 9 is an exploded cross-sectional view, similar to FIG. 8, but showing the insert member of the second embodiment.

In the embodiment of FIG. 2, the insert member 40 includes a body section 70 and a passageway 72 having a size or area greater than the body section 70. As also seen in FIGS. 2 and 6, the first plate 56 of the shroud assembly 44 includes a base member 76 and a rim 80 that extends outwardly from the base member 76 to define a recess 82 for receiving an offset section 84 of the body section 70. The second plate 60 has a raised section 86 that is received in a cut-out of the insert member 40 adjacent to free end portion 64. The second plate 60 also has a sleeve section 88 that extends outwardly therefrom in a direction away from the first plate 56. The sleeve section 88 is used in receiving the connector assembly 52. In that regard and referring to FIG. 8 as well, the connector assembly 52 includes a first leg section 92 and a second leg section 96 integral with each other. In the illustrated embodiment, the leg sections 92, 96 are formed essentially at about a right angle relative to each other The first leg section 92, in this embodiment, has a height corresponding to about ½ the height of the tool assembly 20. The first leg section is fastened or otherwise joined to the first section 24 of the tool assembly 20 using a tool sleeve 100 and a tool connector or fastener 104. An end portion 106 of the first leg section 92 is received within the tool sleeve 100. The tool section 24 has a hole 108 and the first leg section 92 has a threaded bore 112. The tool connector 104 is inserted through the tool section hole 108 and fastened into the threaded bore 112 to hold the connector assembly 52 to the tool assembly 20. The second leg section 96 has a threaded bore 116 and an end portion 118 of this second leg section 96 is positioned within the sleeve section 88 of the second plate 60. Each of the two plates 56, 60 has holes 120, 124, respectively. A fixture connector 128 is insertable through these two aligned holes 120, 124 for receipt by the aligned threaded bore 116 of the second leg section 96 of the connector assembly 52. Upon insertion and fastening, the insert member 40 is held between the plates 56, 60 of the shroud assembly 44 while the shroud assembly 44 is joined to the connector assembly 52.

The configurations or shapes of the sleeve sections 88,100 and their mating end portions 118,106, respectively, are provided to ensure that the fixture assembly is oriented in the desired direction. In particular, these mating members are not circular in cross-section in order to avoid unwanted relative rotation; instead, they are non-circular such as rectangular or triangular.

As should be readily appreciated, the size and arrangement of the connector assembly 52 can vary, depending upon where, within the interior volume 32 of the tool assembly 20, it is desirable to locate the insert member 40. For example, the height of the first leg section 92 and/or length of the second leg section 96 could vary to thereby change where the connector assembly 52 joins to the shroud assembly 44 within the interior volume 32 of the tool assembly 20. Additionally, the fixture assembly may be comprised of collapsible or flexible parts which collapse or flex to facilitate removal at the completion of the rotomolding process.

Figure 3:
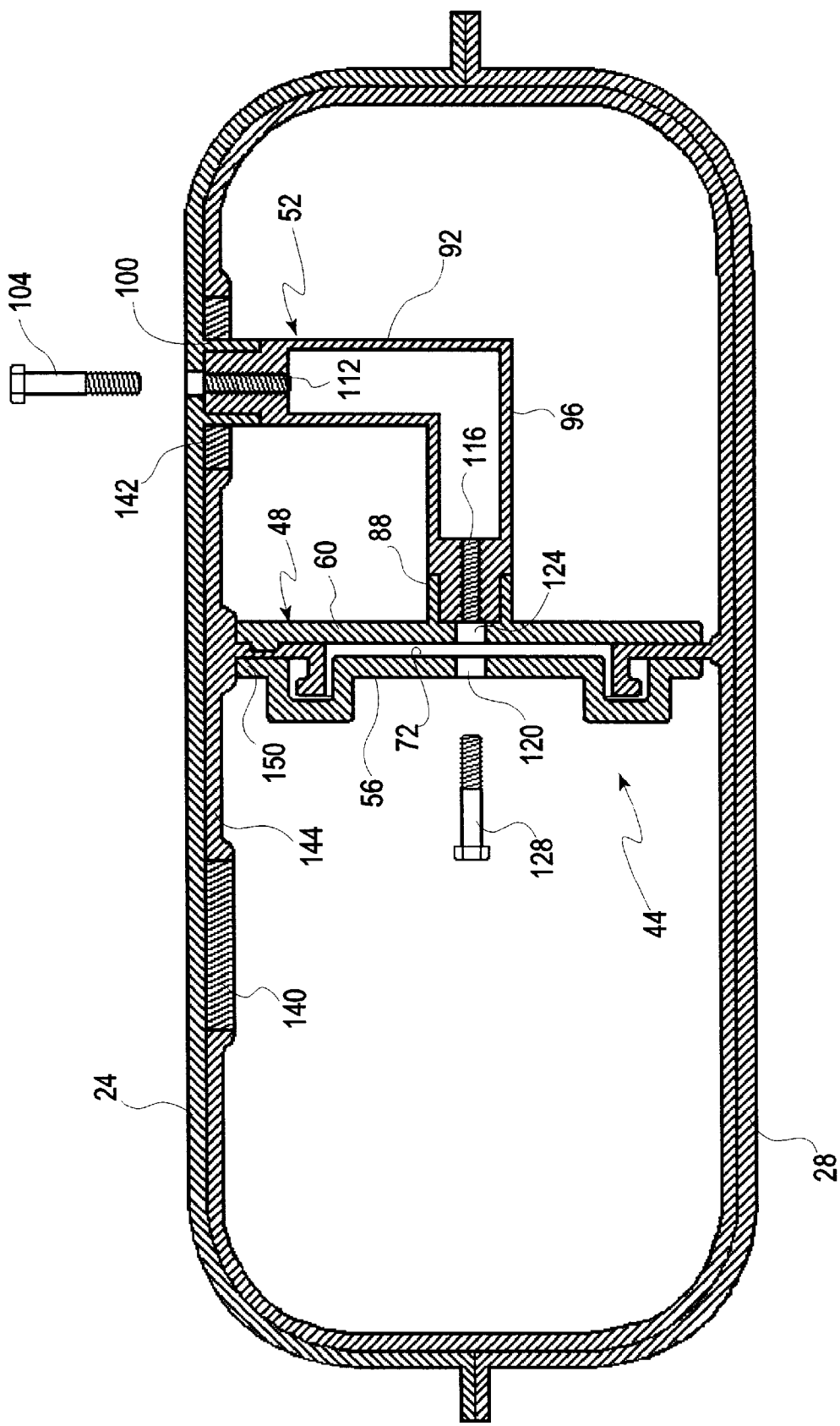
FIG. 3 is a longitudinal section, similar to FIG. 2, but also illustrating the molded unit that was made in the tool assembly.
Figure 4:
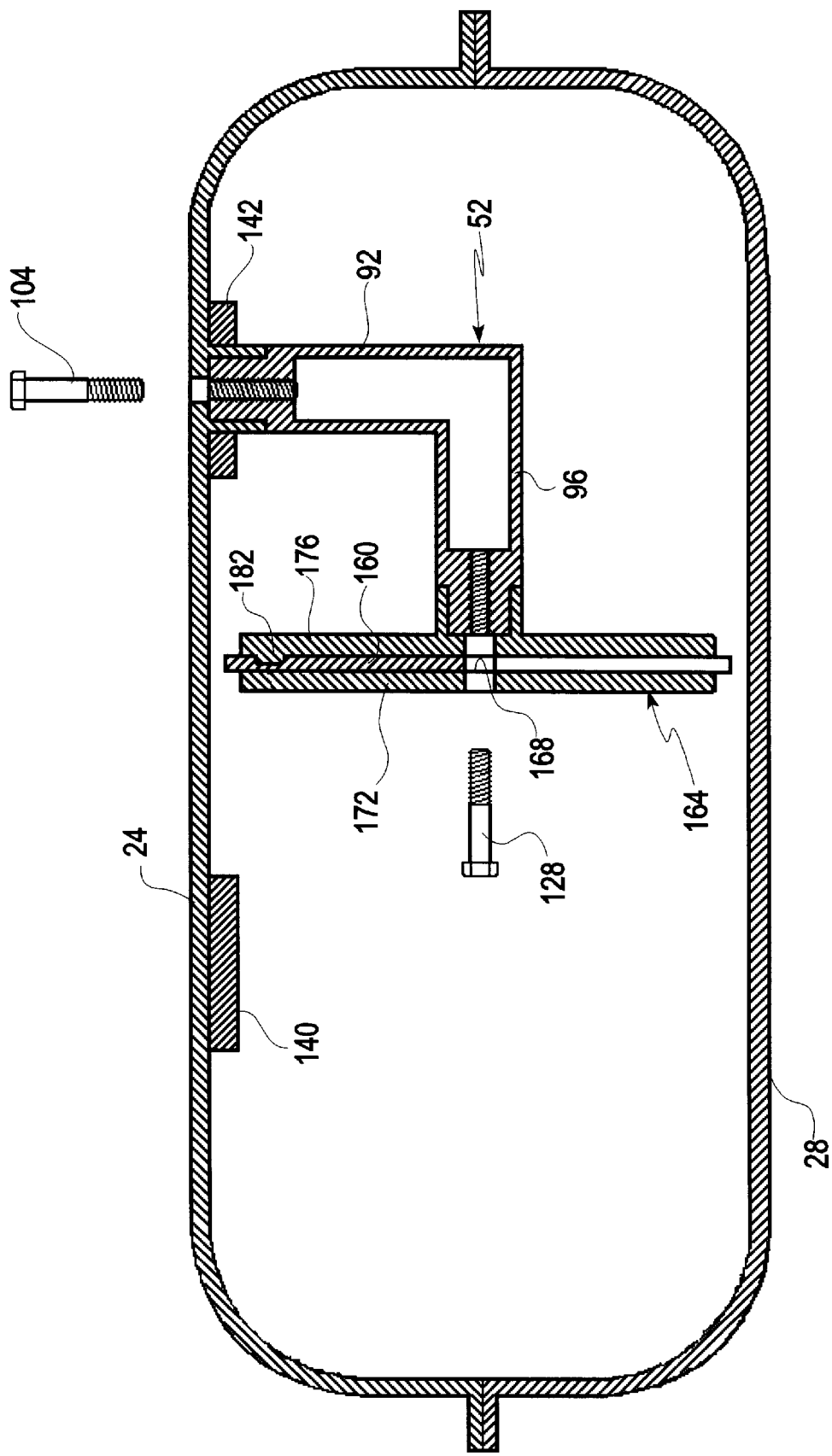
FIG. 4 is a longitudinal section of a tool assembly with the fixture assembly and showing a second embodiment of the insert member having no passageway.
Figure 5:
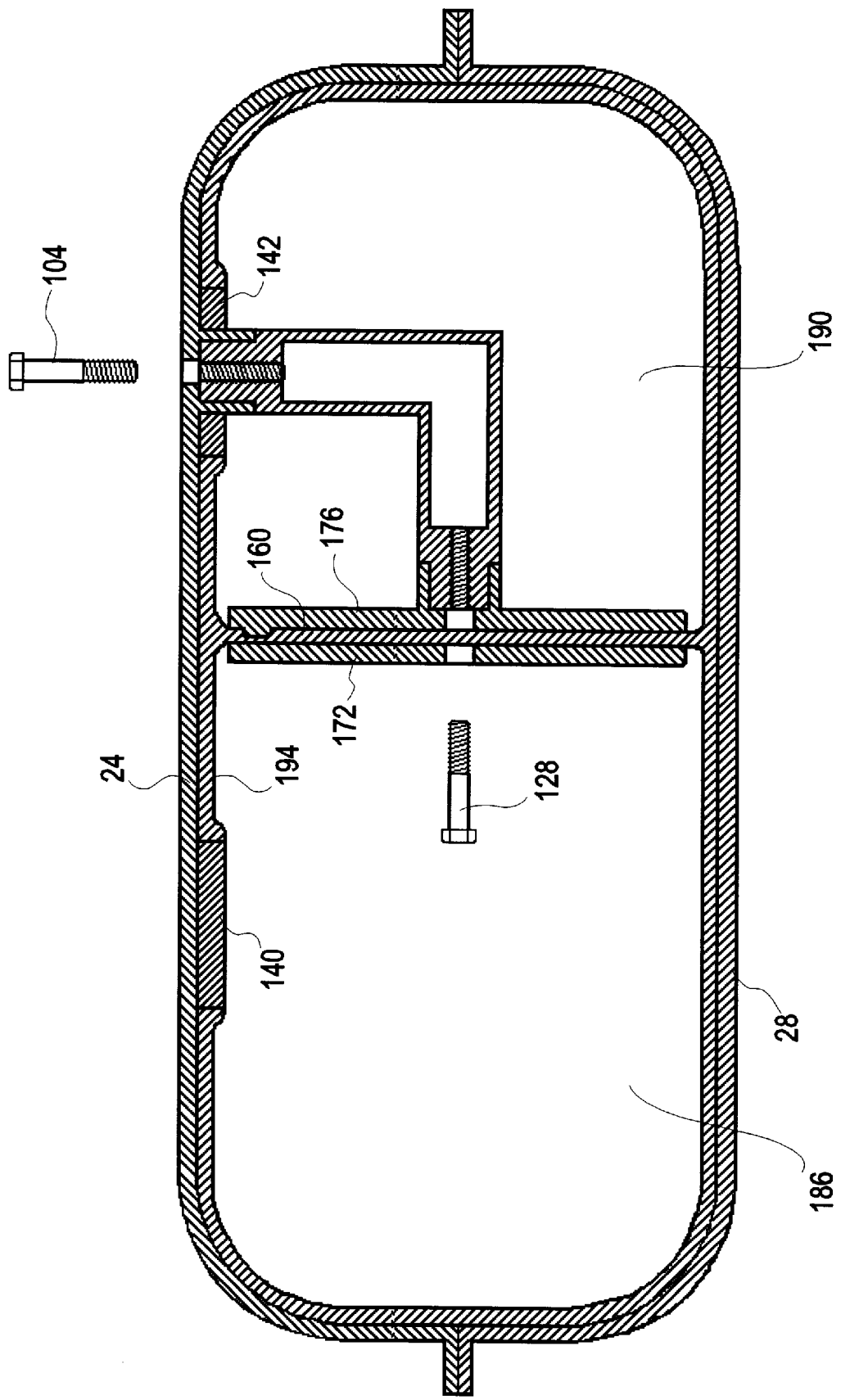
FIG. 5 is a longitudinal section of the tool assembly, similar to FIG. 4, but also showing the molded unit.

The tool assembly 20 also includes, in this illustrated embodiment, first and second access opening forming members 140, 142 joined to one of the inner walls 36 of the tool section 24. The access opening forming members 140, 142 are used in producing access openings in the unit to be molded. The formation of access openings or holes in a molded article is well-known to those of ordinary skill in the art. With reference to FIG. 3, such openings are being defined by the opening forming members 140, 142 in a molded unit 144 that has been produced within the interior volume 32 of the tool assembly 20. The illustration of FIG. 3 is the same as FIG. 2, except showing the molded unit 144 that results from the process for making the molded unit 144, which process will be described further later herein. As also seen in FIG. 3, the gap that previously existed between the free end portions 64 of the insert member 40 and the inner walls 36 of the tool assembly 20 is no longer present since the molded unit 144 includes gap filling molded unit material portions 150 that are comprised of the molded material from which the molded unit 144 was made, together with melted, partially or fully melted, and subsequently solidified free end portions 64 of the insert member 40.

Numerous other embodiments of insert members can be employed. By way of example, FIGS. 4, 5, 7 and 9 illustrate a differently configured insert member 160 and shroud assembly 164. As seen in these drawing figures, the insert member 160 essentially has no passageway, which differs from the large passageway provided in the insert member 40. Instead, a relatively small insert member hole 168 is provided for fastening purposes. As also seen in FIGS. 4, 5, 7 and 9, the shroud assembly 164 has a different configuration, i.e., the shroud assembly 164 includes a substantially planar or flat first plate 172. The second plate 176 is comparable to the second plate 60 of the shroud assembly 48 and includes a boss 182 that is received in a notch of the insert member 160 in order to fixedly hold the insert member 160 within the interior volume 32 of the tool assembly 20 using the connector assembly 52. In this second embodiment, the insert member 160, after the insert member hole 168 is subsequently sealingly filled, results in divided first and second chambers 186, 190 (FIG. 5) in the molded unit 194.

In contrast to the molded unit 194, the molded unit 144, because of the passageway 72, can provide a different kind of container. More specifically, for the molded unit 144, a flexible membrane can be fixedly held to the insert member 40 within the molded unit 144. Such a flexible membrane is movable into one of the two chambers that are defined on either side of the insert member 40. When there is a certain amount of liquid in one of the two chambers, such liquid will cause the flexible membrane to be pushed into the other chamber and thereby create more space for additional liquid in the one chamber, while there is less space for liquid in the other chamber into which the flexible membrane is pushed. Such a utility has particular application with cleaning machines that employ a cleaning liquid and receive a recovered liquid. When such a cleaning machine initially is used to clean, there is a need for a greater amount of cleaning liquid. However, as the cleaning liquid is dispensed to the floor surface being cleaned, the chamber occupied by cleaning liquid has a volume that decreases and which can be occupied by recovered liquid from the floor surface being cleaned. As the recovered liquid fills the other of the two chambers, the flexible membrane tends to be pushed into the chamber having the cleaning liquid. Consequently, as more and more recovered liquid is received, greater space is available as the flexible membrane is pushed into the chamber or tank containing the cleaning liquid since the volume of the cleaning liquid is decreasing.

With respect to the process for making the molded unit 144, a preferred method includes first locating the insert member 40 between the two plates 56, 60 of the shroud assembly 48. The connector assembly 52 is positioned so that the end portion 118 of the second leg section 96 is disposed within the sleeve section 88 of the second plate 60. The fixture connector 128 is inserted through the first plate hole 120, the passageway 72 and the second plate hole 124 to be fastened into the threaded bore 116. The combination of the shroud assembly 48 with insert member 40 and connector assembly 52 is then connected to the inner wall 36 of the first section 24 of the tool assembly 20 by the tool sleeve section 100 receiving the end portion 106 of the second leg section 92. The tool connector 104 is inserted through the hole 108 in the tool section 24 and fastened to the first leg section 92 using the threaded bore 112. The second tool section 28 is then secured to the first section 24 by conventional means to provide the assembled tool assembly 20. Before joining the two sections 24, 28 together, mold material, such as a mold powder, is disposed on both sides of the insert member 40 and the shroud assembly 48 in the separately defined chambers of the interior volume of the tool assembly. The amount of mold powder to be used is known to the practicing artisan and is dependent upon the desired thickness to be achieved in the molded unit.

After these steps, the system including the tool assembly 20 is ready for conventional steps of a rotomolding process. That is, in accordance with well-established process steps, the tool assembly 20 is subject to rotations about desired axes, as well as heating and cooling steps whereby the powdered mold material liquifies and forms the mold material from which the molded unit 144 is produced. In that regard, during the rotomolding process, the free end portions 64 of the insert member 40 fully melt or partially melt and become part of the mold material that occupies the gap 68. Substantial portions of the insert member 40 that are held in the shroud assembly 48 are not subject to melting due to the temperature shielding affect of the shroud assembly 48. Specifically, the shroud assembly 48 acts to prevent melting of the insert member portions held between the two plates 56, 60. As can also be appreciated, the insert member 40, particularly the free end portions 64, are made of a material that is compatible with the mold material from which the molded unit 144 is made.

Figure 10:
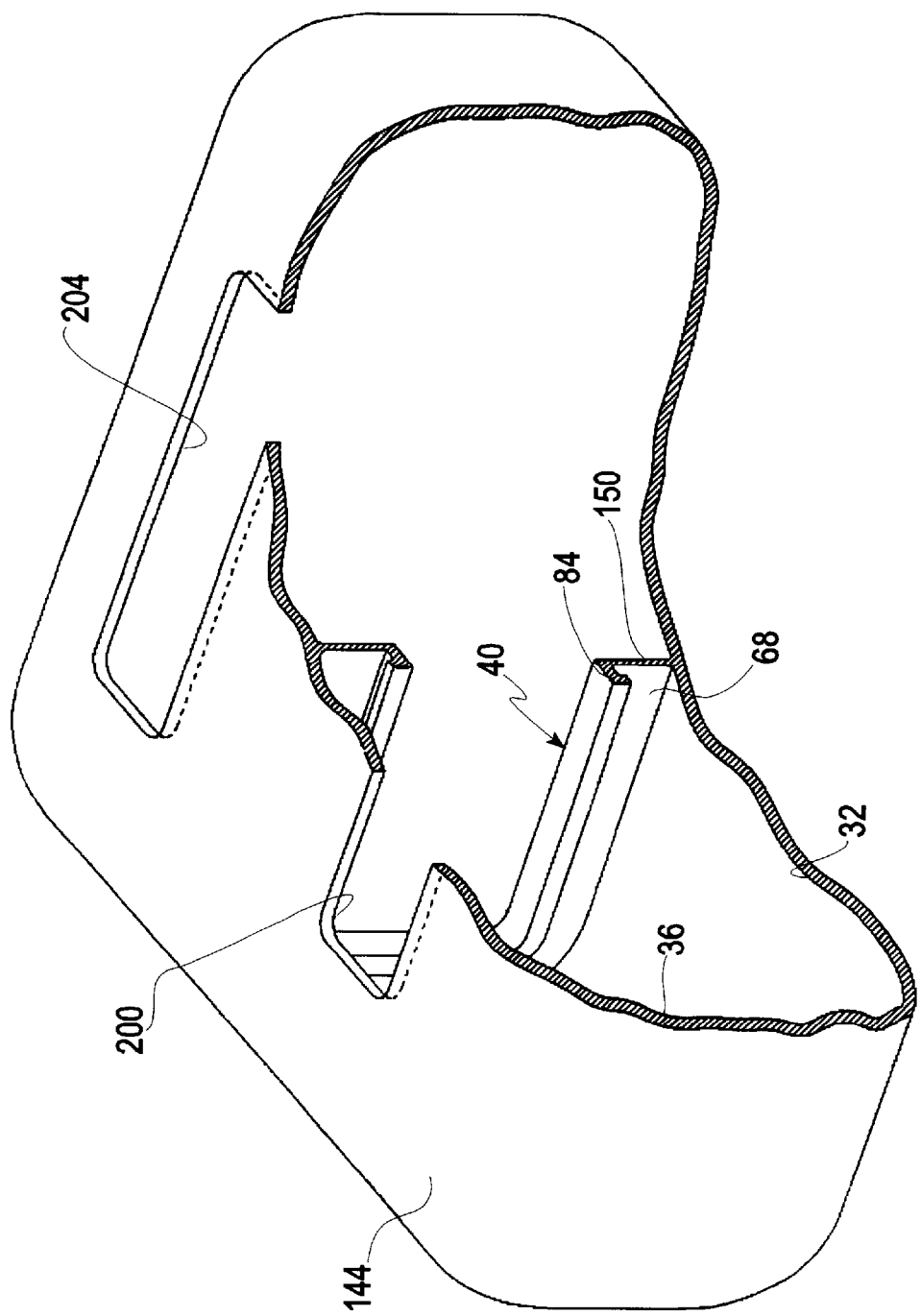
FIG. 10 is a perspective view of the molded unit with a cut-away illustrating the insert member of the first embodiment, as well as illustrating two access openings in the molded unit from which the fixture assembly can be removed.

At the completion of the rotomolding process, at which time the molded unit 144 is formed and contained within the interior volume 32 of the tool assembly 20, the first and second tool sections 24, 28 are separated from each other in order to remove the molded unit 144. In that regard, the tool connector 104 is unfastened from the tool section 24 and the tool sections 24, 28 are separated from each other to gain access to the molded unit 144. The molded unit 144 is moved to a suitable location to next remove the fixture assembly from within the interior of the molded unit 144. With reference to FIG. 10, in connection with the removal of the fixture assembly 44, the hand and arm of an operator or technician is positioned through a first access opening 200 that was formed in the molded unit by means of the access opening forming member 140. With respect to the size of the access opening 200, it has at least a length or width that permits the hand and arm of a technician to be received therethrough, i.e., at least about 2–3 inches, when this embodiment is employed. In another embodiment, a disassembly tool is provided that may not require the same size access opening. In any event, the access opening 200 needs to be large enough to remove one or both plates 56,60. Once inside the interior of the molded unit 144, the technician is able to unfasten or detach the fixture connector 128 using a conventional or suitable tool. Once the fixture connector 128 is removed from the first plate 56 of the shroud assembly 48, the first plate 56 can be removed from the interior of the molded unit 144 through the first access opening 200. Similarly, after the tool connector 104 is unfastened from the tool assembly 20 and the connector assembly 52, the connector assembly 52 can be removed from the interior of the molded unit 144 since the fixture connector 128 is no longer connecting the connector assembly 52 to the shroud assembly 48. In that regard, the connector assembly 52 is removed through a second access opening 204. After the connector assembly 52 is removed, the second plate 60 of the shroud assembly 48 is next removed through the second access opening 204 or, alternatively, the second plate 60 could be manipulated through the passageway 72 for removal from the molded unit 144 through the first access opening 200.

The molded unit 144, as well as the molded unit 194, can be used as a tank in a cleaning machine. The access openings 200, 204 are useful in conveying cleaning liquid or recovered liquid relative to the tank. Alternatively, one or both access openings can be covered or closed to prevent spillage or leakage of liquid.

Figure 11:
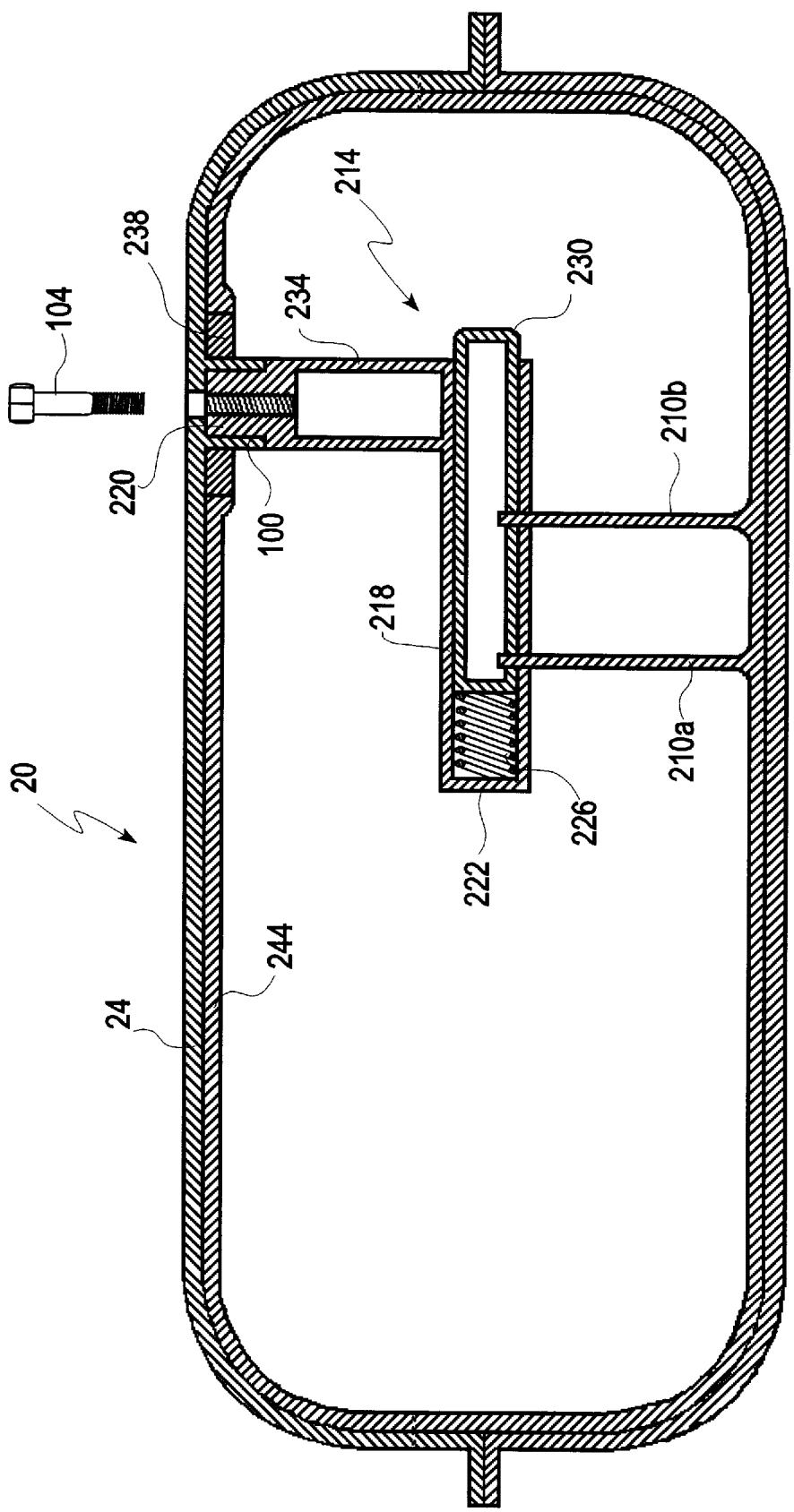
FIG. 11 is a longitudinal section of the tool assembly and molded unit showing another embodiment of a fixture assembly for holding baffle members in place.

In addition to the two embodiments in which the insert members 40, 160 extend along all of the inner walls 36 of the tool assembly 20, another representative embodiment of a fixture assembly and insert member is illustrated in FIG. 11. As seen in FIG. 11, baffle members 210a, 210b are the inserts disposed within the interior volume 32 of the tool assembly 20. The baffle members 210a, 210b are held within the interior volume 32 by means of a fixture assembly 214, which includes a guide member 218 having a closed end 222. A compression spring 226 is disposed within the guide member 218 at the closed end 222. The guide member 218 includes one or more slots for receiving first or upper ends of the baffle members 210a, 210b. Positioned within the guide member 218 is a slide member 230, which has one or more apertures for alignment with the slots in the guide member 218. According to this embodiment, the slide member 230 is pushed against the force of the compression spring 226 to align the apertures of the slide member 230 with the slots of the guide member 218 in order to receive the first ends of the baffle members 210a, 210b. Once these ends of the two baffle members 210a, 210b are positioned within these aligned openings into the interior of the slide member 230, the force of the compression spring 226 pushes away from the closed end 222 in connection with fixedly holding the baffle members 210a, 210b in their predetermined positions relative to the guide member 218.

The fixture assembly 214 also includes a leg section 234 that is integral with the guide member 218 and, preferably, forming about a right angle relative thereto. The end of the leg section 234 is received within the tool sleeve section 100. An access opening forming member 238 is provided at that area of the tool assembly 20 to which the leg section 234 is fastened by the tool connector 104.

When assembling the fixture assembly 214 with the baffle members 210a, 210b joined to the guide member 218, the end portion 220 of the leg section 234 is connected to the first tool section 24 of the tool assembly 20 by means of the tool sleeve 100 while the first tool section 24 is separated from the second tool section 28. After the fixture assembly 214 and the baffle members 210a, 210b are joined to the first tool section 24, the second tool section 28 is joined to the first tool section 24 while the mold material is placed within the interior volume 32 of the tool assembly 20.

Like the previous embodiments, during the rotomolding process, the mold material liquifies and second or lower end portions of the baffle members 210a, 210b melt, or partially melt, to become part of a mold material that occupies a gap that was defined when the baffle members 210a, 210b were initially held within the interior volume of the tool assembly and before the rotomolding process.

Figure 12:
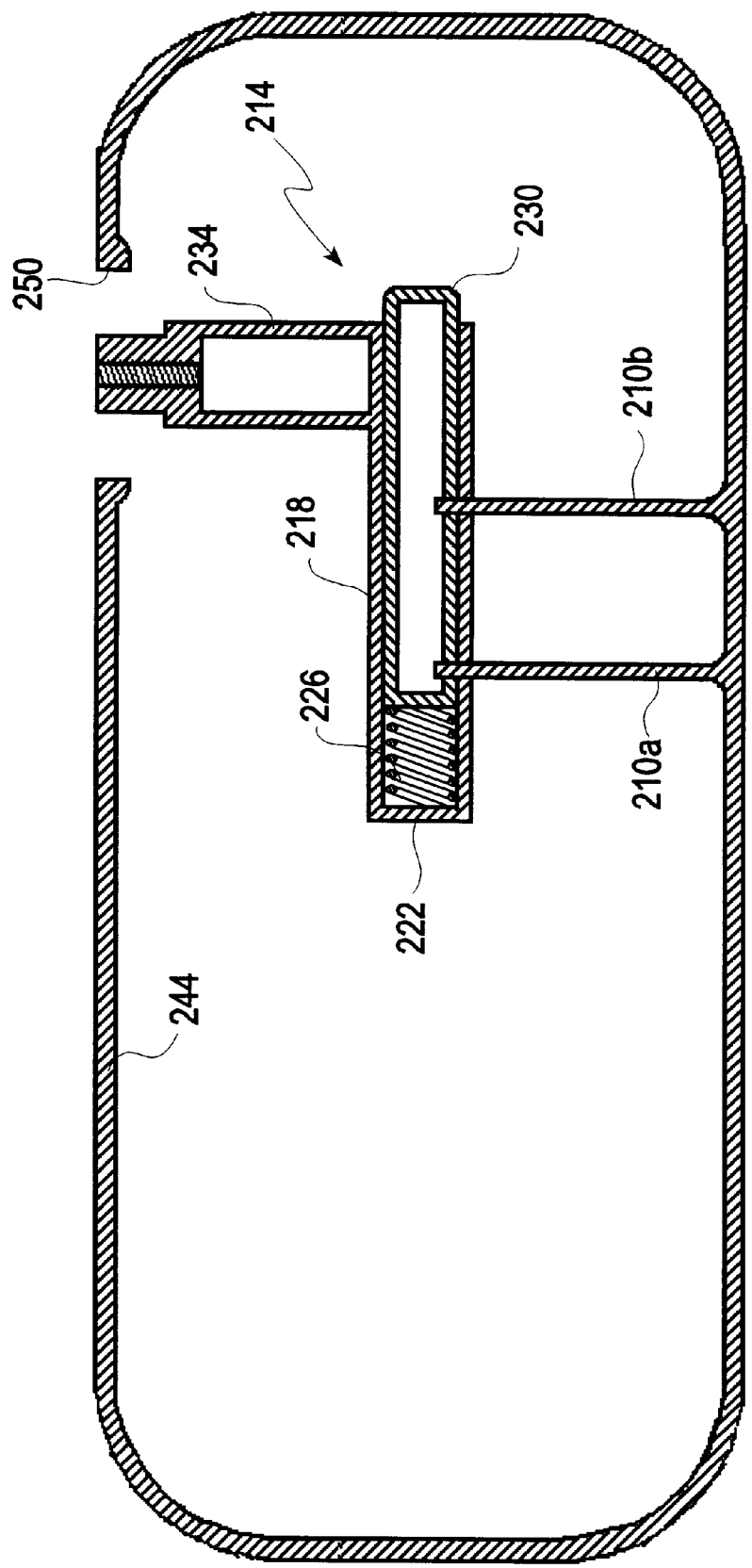
FIG. 12 is a longitudinal section, similar to FIG. 11, illustrating the formed molded unit with access opening for removal of the fixture assembly of this embodiment.

With reference to FIG. 12, after forming the molded unit 244 by means of the rotomolding process, the tool sections 24, 28 are separated. During the separation process, the tool connector 104 is unfastened from the fixture assembly 214 to permit the separation. Subsequently, the molded unit 244 with the fixture assembly 214 are moved to a convenient location for removal of the fixture assembly 214. In that regard, the access opening 250 formed in the molded unit 244 using the access opening forming member 238 is of a sufficient size to permit the operator or technician to insert his/her hand and arm into the interior of the molded unit 244 or to insert a disassembly tool. Once within the interior of the molded unit 244, the technician can manipulate or push the slide member 230 against the force of the compression spring 226 in order to permit the first ends of the baffle members 210a, 210b to be detached from the guide member 218 and the slide member 230. After this detachment, the fixture assembly 214 can be manipulated and removed from the interior of the molded unit 244 through the access opening 250. Consequently, upon removal of the fixture assembly 214, only the baffle members 210a, 210b remain within the interior of the molded unit 244 and the molded unit 244 can then be used as a container or tank for containing liquid in which movement of the liquid is controlled by the baffle members 210a, 210b. As should also be appreciated, the access opening 250 can be filled or closed with a sealant or cover member via conventional means to provide a closed, sealed container. The access opening 250 can also be used as a passage for receiving liquid into the interior of the molded unit 244 as well as an exit for removal of liquid therefrom.

The foregoing discussion of the invention has been presented for purposes of illustration and description. Further, the description is not intended to limit the invention to the form disclosed herein. Consequently, variation and modification commensurate with the above teachings, and within the skill and knowledge of relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for making a molded unit, comprising:
   providing a tool assembly having an interior volume and an inner surface;
   affixing a fixture assembly within said tool assembly;
   attaching an insert member having an interior end and an opposite end with a width to said fixture assembly, said interior end being positioned at a greater distance from said inner surface of said tool assembly than said opposite end is positioned from said inner surface, wherein said opposite end of said insert member is spaced from said inner surface of said tool assembly to define a gap having a lateral extent that is bounded by said opposite end width of said insert member and in which all portions of said fixture assembly are spaced from and located outwardly of said gap;
   placing mold material in said tool assembly;
   creating a molded unit having at least a first access opening and an interior defined by an inner wall using said tool assembly in a rotomolding process, with at least substantial portions of said fixture assembly disposed interiorly of said inner wall, said first access opening being spaced from and different from any portion of said insert member, and said first access opening communicating with said molded unit interior; and
   removing said substantial portions of said fixture assembly from said interior of said molded unit using said first access opening formed in said molded unit.

2. A method, as claimed in claim 1, wherein:
   said insert member being meltable such that, during said creating step, at least portions of said opposite end of said insert member adjacent to said gap melt, wherein said mold material and said insert member are joined together.

3. A method, as claimed in claim 1, wherein:
   at least one of said fixture assembly and said insert member act to divide said interior volume of said tool assembly into first and second chambers and said step of placing includes locating first portions of said mold material in said first chamber and locating second portions of said mold material in said second chamber.

4. A method, as claimed in claim 1, wherein:
   said tool assembly has a height and said fixture assembly has a first dimension of at least one-half said height of said tool assembly.

5. A method, as claimed in claim 1, wherein:
   said removing step includes inserting a body member having a width of at least two inches into and past said first access opening.

6. A method, as claimed in claim 1, wherein:
   said access opening is greater than about 3 inches.

7. A method, as claimed in claim 1, wherein:
   said access opening is of a size to permit passage of different sized fixture assemblies.

8. A method, as claimed in claim 1, wherein:
   portions of said fixture assembly are joined together while in said interior volume of said tool assembly.

9. A method, as claimed in claim 1, wherein:
   said attaching step is conducted while said insert member and at least portions of said fixture assembly are located within said interior of said tool assembly.

10. A method for making a molded unit, comprising:
    providing a tool assembly having an interior volume;
    affixing a fixture assembly within said tool assembly;
    attaching an insert member to said fixture assembly;
    creating a molded unit having at least a first access opening and an interior defined by an inner wall using said tool assembly in a rotomolding process, at least substantial portions of said fixture assembly disposed interiorly of said inner wall, said first access opening being spaced from and different from any portion of said insert member and said first access opening having a dimension of at least two inches to permit removal of said fixture assembly; and removing said substantial portions of said fixture assembly from said interior of said molded unit, said removing step including inserting at least portions of one of a disassembly tool and a body member into and past said first access opening and, after said inserting step, using said at least one of said disassembly tool and said body member related to detaching said substantial portions of said fixture assembly.

11. A method, as claimed in claim 10, wherein:

said tool assembly has an inner surface and said insert member is spaced from said inner surface to define a gap, said insert member being made of a meltable material that at least partially melts and in which, during said creating step, at least end portions of said insert member adjacent to said gap melt so that said mold material and said insert member are joined together.

12. A method, as claimed in claim 11, wherein:

all portions of said fixture assembly are spaced from and located outwardly of said gap.

13. A method, as claimed in claim 1, wherein:

said removing step includes inserting at least portions of one of a disassembly tool and a body member into and past said first access opening and, after said inserting step, using said at least one of said disassembly tool and said body member related to detaching said substantial portions of said fixture assembly.

* * * * *